US012753730B2

(12) United States Patent
Ogawa

(10) Patent No.: US 12,753,730 B2
(45) Date of Patent: Oct. 6, 2026

(54) COMBUSTION MODE SWITCHING ENGINE

(71) Applicant: PD AeroSpace, LTD., Nagoya (JP)

(72) Inventor: Shuji Ogawa, Aichi (JP)

(73) Assignee: PD AeroSpace, LTD., Aichi (JP)

( * ) Notice: Subject to any disclaimer, the term of this patent is extended or adjusted under 35 U.S.C. 154(b) by 0 days.

(21) Appl. No.: 18/844,401

(22) PCT Filed: Mar. 7, 2023

(86) PCT No.: PCT/JP2023/008638

§ 371 (c)(1),
(2) Date: Sep. 6, 2024

(87) PCT Pub. No.: WO2023/171681

PCT Pub. Date: Sep. 14, 2023

(65) Prior Publication Data

US 2025/0188893 A1 Jun. 12, 2025

(30) Foreign Application Priority Data

Mar. 7, 2022 (JP) ................................ 2022-034511

(51) Int. Cl.
*F02K 9/78* (2006.01)
*F02C 5/00* (2006.01)
(Continued)

(52) U.S. Cl.
CPC .................. *F02K 9/78* (2013.01); *F23R 7/00* (2013.01); *F02C 5/00* (2013.01); *F02C 5/02* (2013.01);
(Continued)

(58) Field of Classification Search
CPC ...... F23R 7/00; F02C 5/00; F02C 5/02; F02K 7/06; F02K 7/067; F02K 7/075; F02K 7/20; F02K 9/66; F02K 9/74; F02K 9/78
See application file for complete search history.

(56) References Cited

U.S. PATENT DOCUMENTS 3,240,010 A * 3/1966 Morrison .................. F02K 9/66 60/213
9,816,463 B2 * 11/2017 Falempin .................. F23R 7/00
(Continued)

FOREIGN PATENT DOCUMENTS

JP 5014071 8/2012
JP 2017-142044 8/2017

OTHER PUBLICATIONS

International Search Report and Written Opinion for International Application No. PCT/JP2023/008638 mailed on May 9, 2023, 8 pages.

*Primary Examiner* — Jason H Duger
(74) *Attorney, Agent, or Firm* — Amin, Turocy & Watson, LLP

(57) ABSTRACT

A rotating detonation engine comprising: an outer cylinder that extends in an axial direction; a base that is connected to the outer cylinder, and comprises a plurality of fuel injection ports positioned in a circular ring shape and injecting a fuel, and a plurality of oxidizing agent injection ports positioned in a circular ring shape and injecting an oxidizing agent; an inner cylinder that is positioned in the outer cylinder, and is positioned in the axial direction relative to the base; and a mechanism that switches a combustion space, wherein the combustion space is switched in accordance with a combustion mode.

9 Claims, 3 Drawing Sheets

(51) Int. Cl.

| | |
|---|---|
| ***F02C 5/02*** | (2006.01) |
| ***F02K 7/06*** | (2006.01) |
| ***F02K 7/067*** | (2006.01) |
| ***F02K 7/075*** | (2006.01) |
| ***F02K 7/20*** | (2006.01) |
| ***F02K 9/66*** | (2006.01) |
| ***F02K 9/74*** | (2006.01) |
| ***F23R 7/00*** | (2006.01) |
| *F02K 7/12* | (2006.01) |
| *F02K 7/14* | (2006.01) |
| *F02K 7/16* | (2006.01) |
| *F02K 7/18* | (2006.01) |

(52) U.S. Cl.

CPC ................ *F02K 7/06* (2013.01); *F02K 7/067* (2013.01); *F02K 7/075* (2013.01); *F02K 7/12* (2013.01); *F02K 7/14* (2013.01); *F02K 7/16* (2013.01); *F02K 7/18* (2013.01); *F02K 7/20* (2013.01); *F02K 9/66* (2013.01); *F02K 9/74* (2013.01)

(56) References Cited

U.S. PATENT DOCUMENTS

| | | | | |
|---|---|---|---|---|
| 12,292,198 | B2 * | 5/2025 | Singh | F23R 7/00 |
| 2003/0029162 | A1 * | 2/2003 | Baker | B64D 27/20<br>60/269 |
| 2011/0036067 | A1 * | 2/2011 | Rupp | F02C 7/042<br>60/226.1 |
| 2018/0274788 | A1 * | 9/2018 | Greene | F23R 7/00 |
| 2019/0063372 | A1 * | 2/2019 | Robinson | F02K 7/18 |
| 2020/0132020 | A1 * | 4/2020 | Wickersham | F02C 3/16 |
| 2020/0149496 | A1 * | 5/2020 | Singh | F23R 7/00 |
| 2021/0317789 | A1 * | 10/2021 | Jacob | F23R 3/58 |
| 2022/0003189 | A1 * | 1/2022 | Taylor | F02K 9/66 |
| 2022/0205638 | A1 * | 6/2022 | Delimont | F23R 3/286 |
| 2022/0235727 | A1 * | 7/2022 | Wegener | F02K 9/62 |
| 2022/0389883 | A1 * | 12/2022 | Burd | F02K 3/02 |

* cited by examiner

COMBUSTION MODE SWITCHING ENGINE

TECHNICAL FIELD

The present disclosure relates to a rotary detonation engine that switches the combustion mode.

BACKGROUND ART

As a type of the detonation engine that obtains thrust by using detonation, a pulse detonation engine that intermittently generates detonation with a relatively low frequency is known. PTL 1 discloses an example of switching between jet combustion and rocket combustion by using the operation characteristics and structural characteristic of the above-described pulse detonation engine.

The pulse detonation engine disclosed in PTL 1 can operate in a jet combustion mode of taking air from the atmosphere, and a rocket combustion mode of supplying oxidant from the oxidant tank when air cannot be taken from the atmosphere and the like.

In general, as the detonation generation frequency increases, the detonation engine can obtain higher thrust while suppressing the variation in the obtained thrust. In view of this, in recent years, rotary detonation engines are increasingly proposed that continuously jet fuel and oxidant to increase the ignition energy such that detonation waves propagate in a spiral form. PTL 2 discloses an example of such a rotary detonation engine.

CITATION LIST

Patent Literature

PTL 1
Japanese Patent Publication No. 5014071
PTL 2
Japanese Patent Application Laid-Open No. 2017-142044

SUMMARY OF INVENTION

Technical Problem

The rotary detonation engine disclosed in PTL 2, however, does not assume that the operation is performed in both the case where air can be taken as in the atmosphere, and the case where oxidant cannot be taken as in the outer space.

An object of the present disclosure is to provide a rotary detonation engine that can operate in a jet combustion mode of taking air from the atmosphere and a rocket combustion mode of supplying oxidant from a tank mounted inside.

Solution to Problem

A rotary detonation engine according to the present disclosure includes: an outer cylinder extending in an axial direction; a base including a plurality of fuel injection ports connected to the outer cylinder, located in an annular shape and configured to jet fuel, and a plurality of oxidant jet ports located in an annular shape and configured to jet oxidant; an inner cylinder located inside the outer cylinder and installed in the axial direction with respect to the base; and a mechanism configured to switch a combustion space. The combustion space is switched in accordance with a combustion mode.

A rotary detonation engine according to the present disclosure includes: an outer cylinder extending in an axial direction; a base including a plurality of fuel injection ports connected to the outer cylinder, located in an annular shape and configured to jet fuel, and a plurality of oxidant jet ports located in an annular shape and configured to jet oxidant; an inner cylinder located inside the outer cylinder and installed in the axial direction with respect to the base; and a mechanism configured to switch a direction of a combustion flow. The direction of the combustion flow is switched in accordance with a combustion mode.

Advantageous Effects of Invention

The present disclosure provides a rotary detonation engine that switches the combustion mode between the jet combustion mode and the rocket combustion mode.

DESCRIPTION OF EMBODIMENTS

A rotary detonation engine according to the present disclosure is described below with reference to the drawings.

First Embodiment

Figure 1:
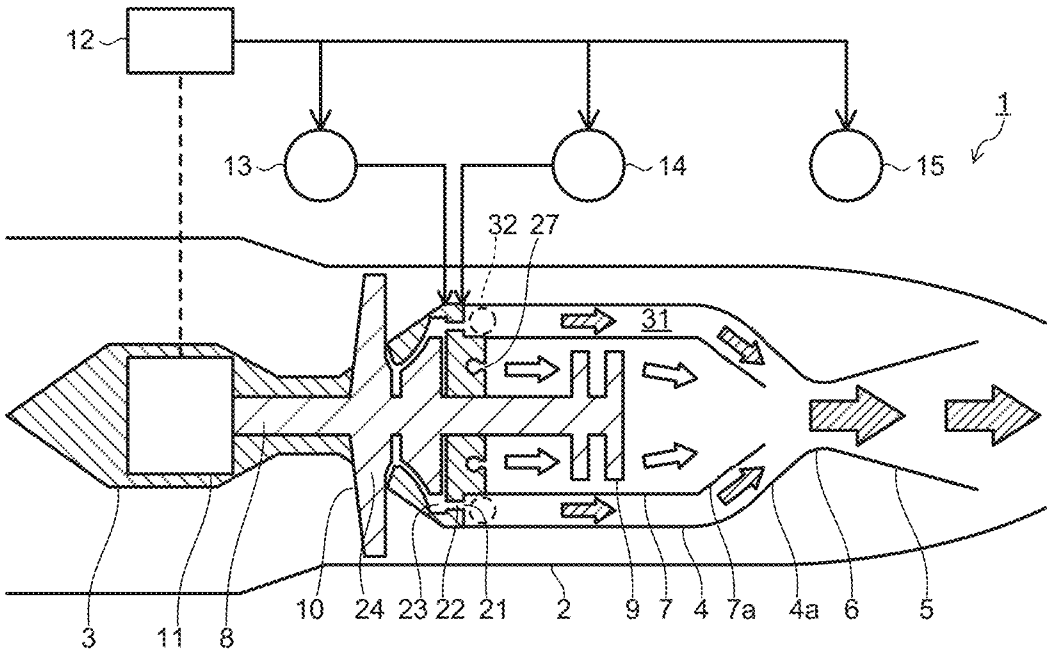
FIG. 1 is a schematic sectional view illustrating a rotary detonation engine according to a first embodiment.

FIG. 1 is a schematic sectional view illustrating rotary detonation engine 1 according to the first embodiment as an aspect of the present disclosure. FIG. 1 illustrates rotary detonation engine 1 in a rocket combustion mode.

Rotary detonation engine 1 is a long apparatus extending along the axis direction of rotary detonation engine 1. Rotary detonation engine 1 includes nacelle 2. Nacelle 2 is an outer hull of rotary detonation engine 1 and is a cylindrical member. The central axis of nacelle 2 coincides with the central axis of rotary detonation engine 1. Nacelle 2 includes openings on the front side (i.e., upstream side) and the rear side (i.e., downstream side) in the travelling direction of rotary detonation engine 1 or a flying member to which rotary detonation engine 1 is attached. Nacelle 2 is configured such that the front opening functions an air inlet, and the rear opening functions as at least one of a combustion gas outlet and an air outlet.

Rotary detonation engine 1 includes base 3 located in a coaxial manner inside nacelle 2. Base 3 has a circular shape in a cross-section perpendicular to the central axis.

Rotary detonation engine 1 includes outer cylinder 4 located in a coaxial manner inside nacelle 2 with an upstream end connected to base 3. Outer cylinder 4 is a member that makes up the outer wall of a combustor. Specifically, rotary detonation engine 1 according to the present disclosure includes only one combustor. Outer cylinder 4 includes, on the downstream side, outer cylinder constriction 4*a* whose diameter decreases toward the downstream side. Outer cylinder constriction 4*a* has a conical shape.

Rotary detonation engine 1 includes nozzle 5 located in a coaxial manner inside nacelle 2 and connected to outer cylinder 4. The connecting part of outer cylinder 4 and nozzle 5 makes up throat 6. Note that nozzle 5 may be configured such that it can be tilted at a given angle with respect to the central axis of rotary detonation engine 1 with a gimbal mechanism.

Rotary detonation engine 1 includes inner cylinder 7 located inside outer cylinder 4. Inner cylinder 7 is a member that partitions the interior of the combustor. Inner cylinder 7 includes, on the downstream side, inner cylinder constriction 7*a* whose diameter decreases toward the downstream side. Inner cylinder constriction 7*a* has a conical shape. Inner cylinder 7 is configured to be relatively movable in the axial direction with respect to base 3. Inner cylinder 7 may be configured to move in the front-rear direction with respect to fixed base 3, and base 3 may be configured to move together with outer cylinder 4 in the front-rear direction with respect to fixed inner cylinder 7.

Rotary detonation engine 1 includes shaft 8 that rotates around the central axis of rotary detonation engine 1. The front portion of shaft 8 is located inside base 3, and the rear portion of shaft 8 protrudes from the rear end of base 3.

Rotary detonation engine 1 includes turbine 9 attached to the rear end side of shaft 8. Turbine 9 is located inside inner cylinder 7. Note that the number of blade rows provided in turbine 9 is not limited. Turbine 9 includes one or more dynamic blade rows attached to shaft 8, and one or more stator blade rows attached to the inner surface of inner cylinder 7. The dynamic blade row and the stator blade row are located to alternate in the axial direction. The length in the axis direction of the gap between the dynamic blade row and the stator blade row adjacent to each other in the axial direction is greater than the maximum distance of the relative movement of inner cylinder 7 with respect to base 3 in the axial direction. In this manner, even when inner cylinder 7 relatively moves in the axial direction with respect to base 3, i.e., even when the stator blade row moves in the axial direction with respect to the dynamic blade row attached to shaft 8, the dynamic blade row and the stator blade row do not make contact with each other. In this manner, inner cylinder 7 can relatively move in the axial direction with respect to base 3 with no problem, and turbine 9 is not damaged even when inner cylinder 7 relatively moves in the axial direction with respect to base 3. Note that each stator blade making up the stator blade row may be fixed to inner cylinder 7 in an unmovable manner, or may be attached to inner cylinder 7 through a pitch angle variable mechanism. By attaching it through the pitch angle variable mechanism, the pitch angle of the stator blade can be adjusted for the optimization of the flow of the combustion gas or cooling fluid inside turbine 9.

Rotary detonation engine 1 includes fan 10 attached to shaft 8. An outer periphery side portion of a part of a plurality of blades making up fan 10 is located in an annular space between nacelle 2 and base 3. In addition, another part of the plurality of blades making up fan 10 is located at an air flow path formed inside base 3. Specifically, fan 10 is also a compressor. Note that the number of blade rows of fan 10 may be set to any number as necessary.

Rotary detonation engine 1 includes rotary electric machine 11 and battery 12. Rotary electric machine 11 is connected to shaft 8 and located inside base 3. Rotary electric machine 11 is connected to battery 12. When electric power is supplied from battery 12, rotary electric machine 11 functions as a motor, so as to rotate shaft 8, fan 10 and turbine 9. In addition, when rotation of turbine 9 is input through shaft 8, rotary electric machine 11 functions as a generator so as to supply electric power to battery 12 and the like. Note that battery 12 may not be a component of rotary detonation engine 1, and a flying member to which rotary detonation engine 1 is attached may include battery 12.

Rotary detonation engine 1 includes fuel supply pump 13 and oxidant supply pump 14. When electric power is supplied from battery 12, fuel supply pump 13 supplies the liquid fuel (e.g., liquid hydrogen or kerosine) in the fuel tank to the combustor. When electric power is supplied from battery 12, oxidant supply pump 14 supplies the liquid oxidant (e.g., oxygen) in the oxygen tank to the combustor. Note that the liquid fuel and the liquid oxidant vaporize in the middle of the supply path. Note that fuel supply pump 13 and oxidant supply pump 14 may not be the components of rotary detonation engine 1, and a flying member to which rotary detonation engine 1 is attached may include them. Note that the thin arrow in FIG. 1 indicates a flow of the electric power, fuel or oxidant.

Rotary detonation engine 1 includes actuator 15. Actuator 15 operates with the electric power supplied from battery 12 or hydraulic pressure, and moves inner cylinder 7 in the axial direction relative to base 3.

In the rearward surface of base 3, a plurality of openings located along one or a plurality of circles around the central axis of base 3 is formed. More specifically, these openings are located along the inner surface of outer cylinder 4 and the outer surface of inner cylinder 7 between outer cylinder 4 and inner cylinder 7. Some of these openings function as air jet port 21. The air functions as oxidant. That is, air jet port 21 is a type of an oxidant jet port. Air jet port 21 is connected with air supply passage 22 extended to the upstream side, and air supply passage 22 is connected with air chamber 23 located on the upstream side. Air chamber 23 is connected with air intake port 24 through the air flow path inside base 3. Air intake port 24 is an annular opening surrounding base 3, and at least one blade row of fan 10 rotates inside it. In addition, at least one blade row of fan 10 rotates inside the air flow path in base 3. In this manner, sufficiently compressed air is supplied to air chamber 23. One air chamber 23 may be formed for one air jet port 21, or one air chamber 23 may be formed for a plurality of air jet ports 21. In addition, one annular air chamber 23 may be formed for all air jet ports 21.

Figure 2:
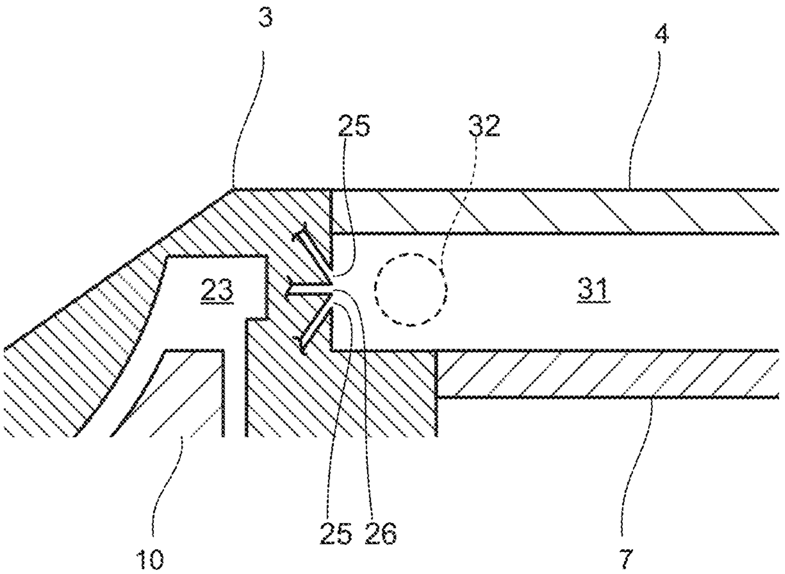
FIG. 2 is a partially enlarged view illustrating the rotary detonation engine according to the first embodiment.

FIG. 2 is a partially enlarged sectional view of rotary detonation engine 1. As described above, a plurality of openings is formed in the rearward surface of base 3. Some of these openings function as fuel injection port 25 to which fuel is supplied, and some of these openings function as oxidant jet port 26 to which oxidant (e.g., oxygen) supplied from oxidant supply pump 14 is supplied, and, some of these openings function as air jet port 21 to which air is supplied (see FIG. 1). The fuel is supplied to fuel injection port 25 from fuel supply pump 13. The oxidant is supplied to oxidant jet port 26 from oxidant supply pump 14. Note that while air jet port 21 is not illustrated in FIG. 2, air jet port 21 is located in the vicinity of fuel injection port 25 in practice. Air jet port 21 and oxidant jet port 26 that jets the oxidant supplied from oxidant supply pump 14 is an aspect of the oxidant jet port. Note that among the plurality of openings provided in base 3, the opening that functions as the oxidant jet port may be configured to jet both the air and the oxidant (e.g., oxygen) supplied from oxidant supply pump 14.

At least one fuel injection port 25, at least one oxidant jet port 26, and at least one air jet port 21 make up one combustion fluid jet unit. At the rearward surface of base 3, a plurality of combustion fluid jet units is located at an equal angular interval around the central axis of rotary detonation engine 1.

In addition, as illustrated in FIG. 1, a plurality of cooling fluid jet ports 27 is formed in the rearward surface of base 3. More specifically, cooling fluid jet port 27 is formed inside inner cylinder 7. Cooling fluid jet port 27 is configured to jet cooling fluid into inner cylinder 7 when inner cylinder 7 is in contact with base 3 as illustrated in FIG. 1. The cooling fluid is oxidant supplied from oxidant supply pump 14, fuel or water vapor, for example. Cooling fluid jet port 27 may be formed to jet the cooling fluid in parallel to the axial direction, or jet the cooling fluid toward the inner surface of inner cylinder 7, i.e., toward the direction inclined with respect to the central axis.

Rotary detonation engine 1 having the above-mentioned configuration operates as follows.

Rocket Combustion Mode

First, a case where rotary detonation engine 1 operates in a rocket combustion mode is described. Note that the rocket combustion mode is a mode in which the fuel is burned with the oxidant supplied from the oxidant tank. The rocket combustion mode is selected in an environment where air cannot be taken from the surroundings as in the outer space, or a given state such as a state where air cannot be taken from the surroundings because the flying member is in a stopped state, for example.

During the operation in the rocket combustion mode, inner cylinder 7 makes contact with base 3, eliminating the gap between inner cylinder 7 and base 3. At this time, first combustion space 31 as a cylindrical space sandwiched by outer cylinder 4 and inner cylinder 7 is formed inside outer cylinder 4 as the outer hull of the combustor. The upstream end of first combustion space 31 is closed with the rearward surface of base 3. The upstream side of first combustion space 31 is an annular space. The downstream side of first combustion space 31 is a conical space sandwiched by outer cylinder constriction 4*a* and inner cylinder constriction 7*a*. First combustion space 31 is terminated at an annular opening toward throat 6 on the downstream side.

Fuel injection port 25 and oxidant jet port 26 formed in base 3 face first combustion space 31. That is, the plurality of combustion fluid jet units face first combustion space 31.

In this state, the fuel and oxidant is jetted from one combustion fluid jet unit (first jet unit) to ignition region 32, which is a region near the combustion fluid jetting unit (first jet unit). When the predetermined condition is satisfied, the jetted fuel is ignited in ignition region 32, and thus detonation occurs. The combustion gas flows downstream inside first combustion space 31. In FIG. 1, the arrow with hatching indicates a flow of the combustion gas. In addition, the detonation waves flow in the downstream direction and circumferential direction inside first combustion space 31. Note that in the rocket combustion mode, ignition region 32 is located inside first combustion space 31.

While the detonation waves and the combustion gas flow inside first combustion space 31, the fuel and oxidant are jetted from the combustion fluid jet unit (second jet unit) located adjacent to the combustion fluid jet unit (first jet section) that has generated the detonation detected above. When the detonation waves generated through the above-described detonation arrive at ignition region 32 that is the region where the fuel and oxidant jetted from the combustion fluid jetting unit (second jet unit) are present, the fuel jetted from the combustion fluid jetting unit (second jet unit) is ignited, and thus the detonation waves flow in the downstream direction and circumferential direction inside first combustion space 31 without interruption. The combustion gas flows downstream inside first combustion space 31.

Thereafter, the combustion fluid jetting unit for jetting the fuel and oxidant is switched one after another in the arrangement order in the circumferential direction, and thus ignition region 32 where the detonation occurs moves in a rotating manner in the circumferential direction. By switching the combustion fluid jetting unit for jetting the fuel and oxidant in a short time, i.e., at a high frequency, the detonation wave can be continuously generated while rotating it in a spiral form inside first combustion space 31, and combustion gas can be continuously discharged. In this manner, variation in thrust obtained with rotary detonation engine 1 can be suppressed.

When the combustion gas flows inside first combustion space 31, inner cylinder 7 is exposed to the combustion gas and thus has a high temperature. In view of this, to cool down inner cylinder 7 from the inner surface side, the cooling fluid, e.g., fuel, oxidant or water vapor, may be jetted from cooling fluid jet port 27. The jetted cooling fluid flows downstream along the inner surface of inner cylinder 7 as indicated with the blank arrow in FIG. 1, and goes out of inner cylinder 7, and then joins with the combustion gas.

When the fuel is used as the cooling fluid, the ratio of the amount of the fuel jetted from fuel injection port 25 and the amount of the oxidant jetted from oxidant jet port 26 may be an oxygen-rich ratio (lean combustion). In this case, after the combustion gas and the fuel as the cooling fluid join, the afterburner effect can be obtained. In addition, through the combustion in the oxygen-rich state, the combustion temperature can be reduced in comparison with the combustion in a theoretical mixing ratio. That is, the thrust can be improved by the afterburner effect while reducing the temperature to which inner cylinder 7 is exposed.

In addition, when the oxidant supplied from oxidant supply pump 14 is used as the cooling fluid, the ratio of the amount of the fuel jetted from fuel injection port 25 and the amount of the oxygen jetted from oxidant jet port 26 may be a fuel-rich ratio. In this case, after the combustion gas and the oxidant as the cooling fluid join, the afterburner effect can be obtained. In addition, through the combustion in the fuel-rich state, the combustion temperature can be reduced in comparison with the combustion in a theoretical mixing ratio. That is, the thrust can be improved by the afterburner effect while reducing the temperature to which inner cylinder 7 is exposed.

In addition, when water vapor is used as the cooling fluid, the ratio of the amount of the fuel jetted from fuel injection port 25 and the amount of the oxygen jetted from oxidant jet port 26 may be a theoretical mixing ratio. The weight of the gas jetted from the nozzle increases due to the mixing of the water vapor with the combustion gas, and thus the thrust can be increased.

In the case of the rocket combustion mode, high temperature combustion gas flows inside the first combustion space 31, i.e., outside the inner cylinder 7. In this manner, turbine 9 does not make contact with the combustion gas although it is located in the combustor and surrounded by first combustion space 31. That is, inner cylinder 7 forms as a protection member that prevents turbine 9 from making contact with the combustion gas inside first combustion space 31. With the function of inner cylinder 7 as the protection member, the life time of turbine 9 can be increased.

Mode Switching

Now the mode switching between the rocket combustion mode and a jet combustion mode is described below. Note that the jet combustion mode is a mode of combustion of fuel with the air taken from the outside (i.e., the atmosphere), and is a mode selected in the atmosphere.

Figure 3:
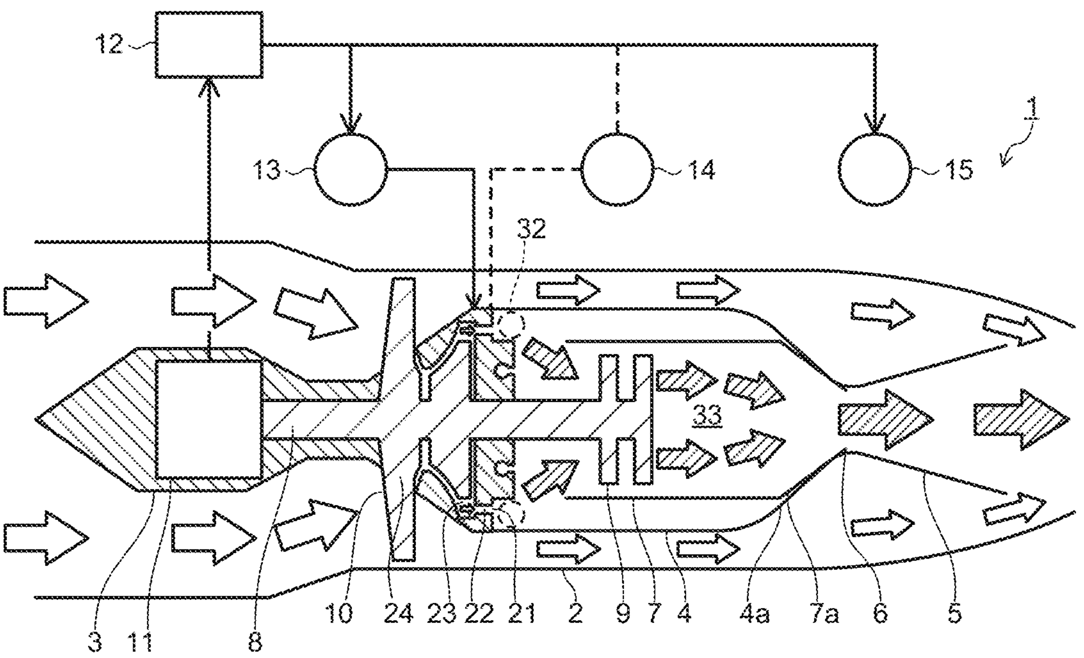
FIG. 3 is a schematic sectional view illustrating the rotary detonation engine according to the first embodiment.

When the mode is switched from the rocket combustion mode to the jet combustion mode, actuator 15 is operated with the electric power supplied from battery 12 or the like. Actuator 15 moves inner cylinder 7 to the downstream side until inner cylinder constriction 7*a* makes contact with outer cylinder constriction 4*a*. FIG. 3 illustrates a state after inner cylinder 7 has moved. When inner cylinder constriction 7*a* makes contact with outer cylinder constriction 4*a* and the movement of inner cylinder 7 stops, the switching from the rocket combustion mode to the jet combustion mode is completed. As described later, through the switching from the rocket combustion mode to the jet combustion mode, the direction of the combustion gas is switched from the direction toward the outside of inner cylinder 7 to the direction toward the inside of inner cylinder 7, and switching from first combustion space 31 to second combustion space 33 is performed.

Conversely, when the mode is switched from the jet combustion mode to the rocket combustion mode, actuator 15 moves inner cylinder 7 to the upstream side until inner cylinder 7 makes contact with base 3. When inner cylinder 7 makes contact with base 3 and the movement of inner cylinder 7 stops, the switching from the jet combustion mode to the rocket combustion mode is completed. As described later, through the switching from the jet combustion mode to the rocket combustion mode, the direction of the combustion gas is switched from the direction toward the inside of inner cylinder 7 to the direction toward the outside of inner cylinder 7, and switching from second combustion space 33 to first combustion space 31 is performed.

Jet Combustion Mode

Now a case where rotary detonation engine 1 operates in the jet combustion mode is described below with reference to FIG. 3.

During the operation in the jet combustion mode, there is a gap between inner cylinder 7 and base 3. In addition, since inner cylinder 7 is in contact with the inner surface of outer cylinder 4, the outlet of first combustion space 31 is closed, and first combustion space 31 does not function. At this time, second combustion space 33 is formed inside inner cylinder 7. The upstream side of second combustion space 33 is a columnar space. The downstream side of second combustion space 33 is a conical space. The downstream end of second combustion space 33 is connected to the inside of throat 6.

In this state, the fuel and air are jetted from one combustion fluid jet unit (first jet unit) to ignition region 32 that is a region in the vicinity of the combustion fluid jet unit. When the predetermined condition is satisfied, the jetted fuel is ignited in ignition region 32, and thus detonation occurs. The combustion gas flows into second combustion space 33 through the gap between base 3 and inner cylinder 7, and flows in the downstream direction inside second combustion space 33. In FIG. 3, the arrow with hatching indicates a flow of the combustion gas. In addition, the detonation waves flow in the downstream direction and circumferential direction inside ignition region 32 and second combustion space 33.

While the detonation waves and the combustion gas flow inside ignition region 32 and second combustion space 33, the fuel and air are jetted from the combustion fluid jet unit (second jet unit) located adjacent to the combustion fluid jet unit (first jet section) that has generated the detonation detected above. When the detonation waves generated through the above-described detonation arrive at ignition region 32 as the region where the fuel and air jetted from the combustion fluid jetting unit (second jet unit) are present, the fuel jetted from the combustion fluid jetting unit (second jet unit) is ignited, and thus the detonation wave flows in the downstream direction and circumferential direction inside first ignition region 32 and second combustion space 33 without interruption. The combustion gas flows downstream inside first combustion space 31.

Thereafter, the combustion fluid jetting unit for jetting the fuel and air is switched one after another in the arrangement order in the circumferential direction, and thus ignition region 32 where the detonation occurs moves in a rotating manner in the circumferential direction. By switching the combustion fluid jetting unit for jetting the fuel and air in a short time, i.e., at a high frequency, the detonation wave can be continuously generated while rotating it in a spiral form inside detonation wave ignition region 32 and second combustion space 33, and combustion gas can be continuously discharged. In this manner, high thrust can be obtained while suppressing variation in thrust obtained with rotary detonation engine 1.

The combustion gas flowing through second combustion space 33 rotates turbine 9. Rotary electric machine 11 connected to turbine 9 through shaft 8 functions as a generator, and supplies the generated electric power to battery 12. Note that rotary electric machine 11 may function as a motor to forcibly rotate turbine 9. By forcibly rotating turbine 9, the combustion gas can be drawn into second combustion space 33 through the gap between base 3 and inner cylinder 7 through ejector effects.

In addition, fan 10 connected to shaft 8 rotates to compress the air taken into nacelle 2. A part of the compressed air passes through the space between nacelle 2 and outer cylinder 4 so as to be jetted from the rear end of nacelle 2, thus contributing to improvement in thrust of rotary detonation engine 1. Note that the blank arrow in FIG. 3 indicates a flow of the air.

In addition, a part of the air compressed by fan 10 enters air chamber 23 through air intake port 24. Air chamber 23 is a type of air reservoir. When air flows into air chamber 23, the flow velocity of the air decreases, and the static pressure of the air increases. In addition, the opening area of air intake port 24 is larger than the passage area of air supply passage 22. Moreover, in the present embodiment, the air is compressed by fan 10. In this manner, even when air chamber 23 and ignition region 32 are connected by air supply passage 22, a high pressure that can push back the combustion gas with a high pressure generated in ignition region 32 is generated inside air chamber 23. Thus, the air can be continuously supplied from air chamber 23 toward ignition region 32 while preventing the flow back of the combustion gas inside air supply passage 22.

Note that by appropriately setting the passage area of air supply passage 22, the high-pressure combustion gas generated in ignition region 32 can be prevented from flowing back inside air supply passage 22, or the influence of the back flow can be reduced during the operation in the rocket combustion mode. In addition, an opening/closing mechanism (e.g., shutter or valve) may be located between air jet port 21 and air intake port 24, e.g., at air supply passage 22 such that this opening/closing mechanism is closed during the rocket combustion mode. By closing the opening/closing mechanism, the back flow of the high-pressure combustion gas in air supply passage 22 can be reliably prevented. The opening/closing mechanism may be configured to automatically open or close in linkage with the relative movement of inner cylinder 7 with respect to base 3. Specifically, the opening/closing mechanism may be configured to close when the rocket combustion mode is selected and inner cylinder 7 makes contact with base 3, and open when the jet combustion mode is selected and inner cylinder 7 is separated away from base 3. The opening/closing mechanism may be configured to be mechanically connected to inner cylinder 7 so as to open or close in mechanical linkage with the relative movement of inner cylinder 7 with respect to base 3. In addition, the opening/closing mechanism may be configured to be opened or closed by an actuator that operates by receiving a control signal when inner cylinder 7 relatively moves with respect to base 3.

Second Embodiment

Figure 4:
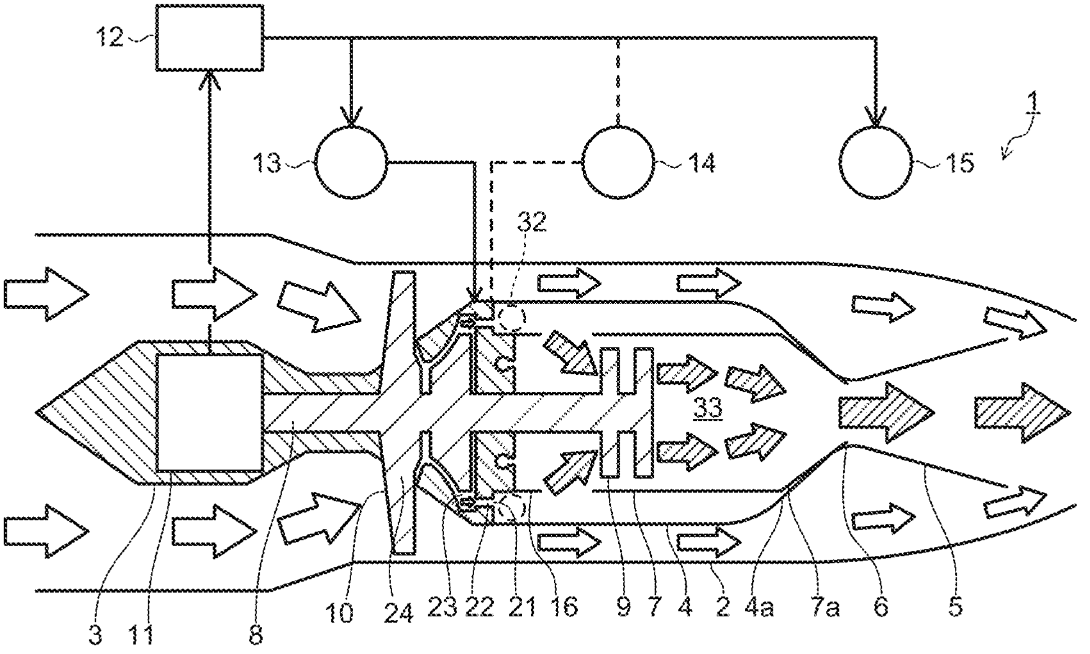
FIG. 4 is a schematic sectional view illustrating a rotary detonation engine according to a second embodiment.

FIG. 4 is a schematic sectional view of rotary detonation engine 1 according to a second embodiment as an aspect of the present disclosure. FIG. 4 illustrates rotary detonation engine 1 in the jet combustion mode. Differences from the first embodiment are mainly described below.

Base 3 provided in rotary detonation engine 1 according to the present embodiment includes annular protrusion 16. Annular protrusion 16 protrudes in an annular shape or a cylindrical shape toward the rear side from the rearward surface of base 3. Inner cylinder 7 can make contact with annular protrusion 16 or go away from annular protrusion 16 through movement in the axial direction. In other words, inner cylinder 7 is composed of two portions, namely a front portion and a rear portion, and the front portion is fixed to base 3.

With inner cylinder 7 making contact with outer cylinder 4 and a gap formed between the upstream end of inner cylinder 7 and the downstream end of annular protrusion 16, rotary detonation engine 1 according to the present embodiment can operate in the jet combustion mode. In addition, with inner cylinder 7 making contact with annular protrusion 16 and a gap formed between inner cylinder 7 and outer cylinder 4, rotary detonation engine 1 according to the present embodiment can operate in the rocket combustion mode.

In the present embodiment, the size of inner cylinder 7 that moves for switching the combustion mode is small. This makes actuator 15 more lightweight and compact. In addition, a region with no or only small variation in channel area can be formed between annular protrusion 16 and outer cylinder 4 on the downstream side of ignition region 32.

In this manner, the combustion can be stabilized.

Modifications

The rotary detonation engine according to the present disclosure is not limited to the above-described embodiments, and includes various variations to the extent that the intent is not departed from.

Figure 5:
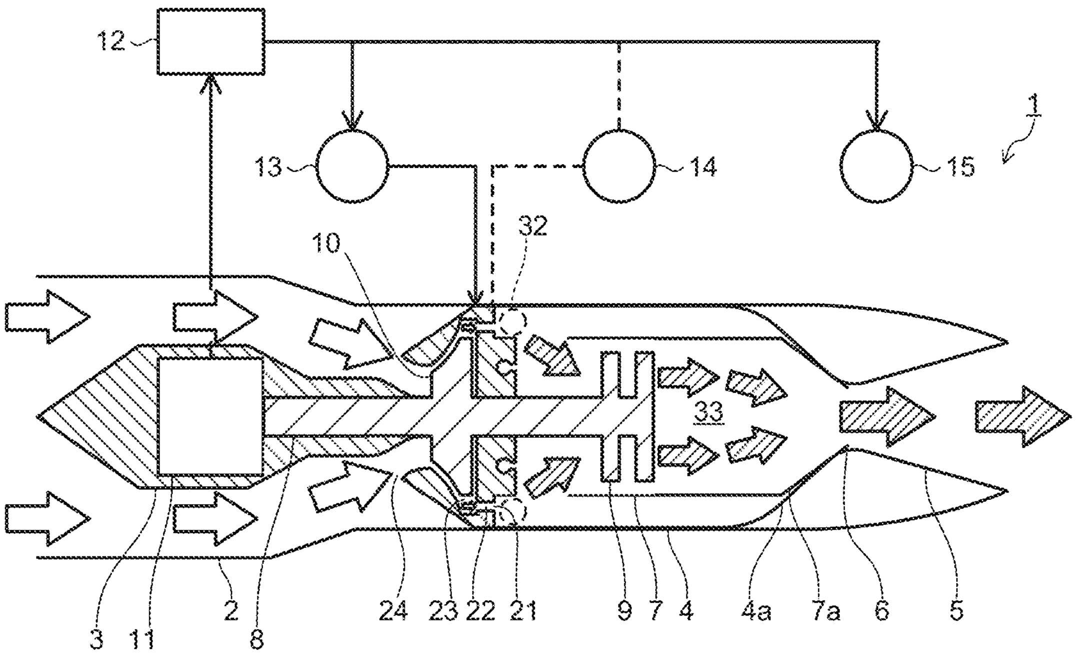
FIG. 5 is a schematic sectional view illustrating a rotary detonation engine according to a modification.
Figure 6:
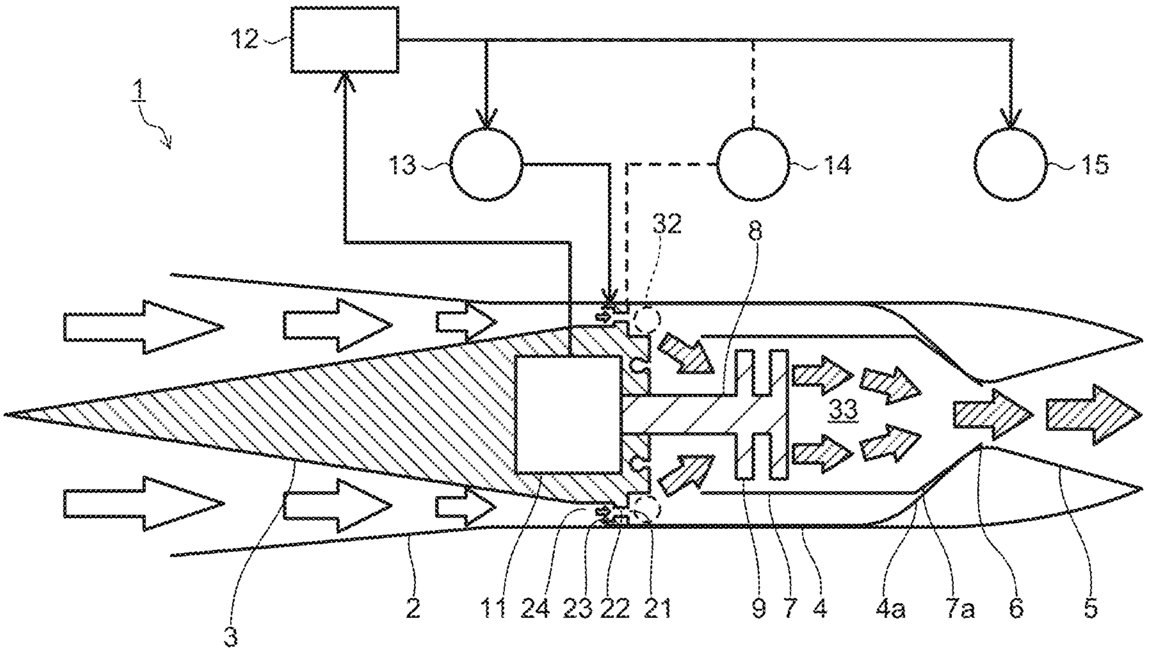
FIG. 6 is a schematic sectional view a rotary detonation engine according to a modification.

In rotary detonation engine 1 according to the above-described embodiments, the air compressed by fan 10 flows into the space between nacelle 2 and outer cylinder 4. That is, rotary detonation engine 1 according to the above-described embodiments is an engine of a turbo fan type. However, rotary detonation engine 1 according to the present disclosure may be an engine of a turbojet type in which the air compressed by fan 10 is supplied only to the combustor inside outer cylinder 4 through air chamber 23 as illustrated in FIG. 5. In addition, rotary detonation engine 1 according to the present disclosure may be an engine of a ramjet engine type that does not include fan 10 as illustrated in FIG. 6. In this case, in the atmosphere, the air compressed by the ram pressure is taken after sufficient acceleration in the rocket combustion mode.

In addition, during the operation in the jet combustion mode, when a sufficient amount of combustion gas can be taken into second combustion space 33 through the gap between base 3 and inner cylinder 7 by rotating turbine 9, inner cylinder 7 may not be in contact with the inner surface of outer cylinder 4, for example. That is, a gap may be provided between inner cylinder 7 and outer cylinder 4.

In addition, during the operation in the rocket combustion mode, when the cooling fluid is jetted from cooling fluid jet port 27, rotary electric machine 11 may function as a motor to forcibly rotate turbine 9. By forcibly rotating turbine 9, the cooling fluid can be reliably carried to the downstream side without allowing it to retain inside inner cylinder 7. That is, the cooling fluid can be carried toward the inner surface of inner cylinder 7.

The rotary detonation engine according to the present disclosure is lightweight because it includes only one combustor. In addition, the rotary detonation engine according to the present disclosure can operate in both the rocket combustion mode and the jet combustion mode with a simple mechanism of moving the inner cylinder that serves as a member for partitioning the interior of the combustor in the single combustor. Further, in either mode, the rotary detonation engine according to the present disclosure can operate by generating rotating detonation waves inside the single combustor. That is, high thrust with suppressed variation can be obtained by generating detonation waves at a high frequency.

This application is entitled to and claims the benefit of Japanese Patent Application No. 2022-034511 filed on Mar. 7, 2022, the disclosure each of which including the specification, drawings and abstract is incorporated herein by reference in its entirety.

INDUSTRIAL APPLICABILITY

The present disclosure can be used as an engine of a spacecraft or the like that travels between the atmosphere and the outer space.

REFERENCE SIGNS LIST

1 Rotary detonation engine
2 Nacelle
3 Base
4 Outer cylinder
**4*a*** Outer cylinder constriction
5 Nozzle
6 Throat
7 Inner cylinder
**7*a*** Inner cylinder constriction
8 Shaft
9 Turbine
10 Fan
11 Rotary electric machine

12 Battery
13 Fuel supply pump
14 Oxidant supply pump
15 Actuator
16 Annular protrusion
21 Air jet port
22 Air supply passage
23 Air chamber
24 Air intake port
25 Fuel injection port
26 Oxidant jet port
27 Cooling fluid jet port
31 First combustion space
32 Ignition region
33 Second combustion space

What is claimed is:

1. A rotary detonation engine comprising:

an outer cylinder extending in an axial direction;

a base connected to the outer cylinder, the base including a plurality of fuel injection ports located in an annular shape and configured to jet fuel, and a plurality of oxidant jet ports located in an annular shape and configured to jet oxidant;

an inner cylinder located inside the outer cylinder and installed in the axial direction with respect to the base; and a mechanism configured to switch a combustion space, wherein the combustion space is switched in accordance with a combustion mode, wherein the inner cylinder is configured to be relatively movable in the axial direction with respect to the base, so as to form a first combustion space between the inner cylinder and the outer cylinder when the inner cylinder is in contact with the base, and form a second combustion space inside the inner cylinder when the inner cylinder is separated from the base.

2. The rotary detonation engine according to claim 1, wherein the inner cylinder is configured to make contact with the outer cylinder and close an outlet of the first combustion space when the inner cylinder is separated from the base.

3. The rotary detonation engine according to claim 1, wherein the base includes:

a plurality of air supply passages connected to the plurality of oxidant jet ports, and an air chamber connected to the plurality of air supply passages, and including an air intake port with an opening area larger than a passage area of each of the plurality of air supply passages.

4. The rotary detonation engine according to claim 1, wherein the base includes a cooling fluid jet port configured to jet cooling fluid to inside of the inner cylinder when the inner cylinder is in contact with the base.

5. The rotary detonation engine according to claim 1, further comprising:

a turbine surrounded by the first combustion space, wherein contact with combustion gas inside the first combustion space is prevented by the inner cylinder;

a shaft connected to the turbine; and a rotary electric machine connected to the shaft.

6. The rotary detonation engine according to claim 5, wherein the turbine includes:

a dynamic blade row attached to the shaft, and a stator blade row attached to the inner cylinder, and wherein a length of a gap between the dynamic blade row and the stator blade row in the axial direction is greater than a maximum distance of relative movement of the inner cylinder in the axial direction with respect to the base.

7. The rotary detonation engine according to claim 1, wherein the base includes an annular protrusion with which the inner cylinder makes contact.

8. The rotary detonation engine according to claim 1, further comprising an oxidant supply pump, wherein when the inner cylinder is in contact with the base, oxidant supplied from the oxidant supply pump is jetted from the plurality of oxidant jet ports to operate in a rocket combustion mode, and wherein when the inner cylinder is separated from the base, air taken from outside is jetted from the plurality of oxidant jet ports to operate in a jet combustion mode.

9. A rotary detonation engine comprising:

an outer cylinder extending in an axial direction;

a base connected to the outer cylinder, the base including a plurality of fuel injection ports located in an annular shape and configured to jet fuel, and a plurality of oxidant jet ports located in an annular shape and configured to jet oxidant;

an inner cylinder located inside the outer cylinder and installed in the axial direction with respect to the base; and a mechanism configured to switch a direction of a combustion flow, wherein the direction of the combustion flow is switched in accordance with a combustion mode, wherein the inner cylinder is configured to be relatively movable in the axial direction with respect to the base, so that the direction of the combustion flow is directed toward an outside of the inner cylinder when the inner cylinder is in contact with the base, and the direction of the combustion flow is directed toward an inside of the inner cylinder when the inner cylinder is separated from the base.

* * * * *